(12) United States Patent
Von Ilberg et al.

(10) Patent No.: US 6,507,335 B1
(45) Date of Patent: Jan. 14, 2003

(54) POINTING DEVICE WITH ADJUSTABLE PALM REST

(75) Inventors: Stephan A. Von Ilberg, San Carlos, CA (US); Peter Sheehan, Bray (IE)

(73) Assignee: Logitech Europe S.A. (CH)

( * ) Notice: Subject to any disclaimer, the term of this patent is extended or adjusted under 35 U.S.C. 154(b) by 0 days.

(21) Appl. No.: 09/417,902

(22) Filed: Oct. 14, 1999

(51) Int. Cl.[7] .................................................. G09G 5/08
(52) U.S. Cl. ...................... 345/167; 345/156; 345/160; 345/164; 345/168
(58) Field of Search ................................ 345/167, 168, 345/164, 160, 159, 156; D14/417, 403, 440, 114

(56) References Cited

U.S. PATENT DOCUMENTS

| | | | | |
|---|---|---|---|---|
| 5,281,958 A | * | 1/1994 | Ashmun et al. | 345/157 |
| 5,543,821 A | * | 8/1996 | Marchis et al. | 345/167 |
| 6,031,518 A | * | 2/2000 | Adams et al. | 345/156 |
| 6,075,516 A | * | 6/2000 | Rice | 345/156 |

* cited by examiner

Primary Examiner—Richard Hjerpe
Assistant Examiner—Ali Zamani
(74) Attorney, Agent, or Firm—Townsend and Townsend and Crew LLP

(57) ABSTRACT

An apparatus which consists of a pointing device and a pad for supporting a portion of the hand. A connector is provided for connecting the pad to the pointing device such that the pad can be oriented at different angles to the pointing device.

20 Claims, 4 Drawing Sheets

POINTING DEVICE WITH ADJUSTABLE PALM REST

CROSS-REFERENCES TO RELATED APPLICATIONS

BACKGROUND OF THE INVENTION

The present invention relates to pointing devices and to palm or wrist support pads.

A wide variety of wrist or palm support pads have been developed for pointing devices and keyboards. Typically, for a keyboard, an elongated foam pad can be placed in front of the keyboard for wrist support. For a mouse or trackball, a mouse pad can be used, with some mouse pads including a pillow-like wrist support on the front end. Typically, these pads are sold separately from any pointing device, although some keyboard pads can be purchased which attach to the keyboard in a fixed position.

Another approach used in pointing devices is to make the pointing device itself more ergonomic. In particular, a palm support region is often built into the mouse, trackball, etc. One of the challenges of such a design is to shape the palm support region so that it can accommodate different hand sizes and different hand positions.

SUMMARY OF THE INVENTION

The present invention provides an apparatus which consists of a pointing device and a pad for supporting a portion of the hand. A connector is provided for connecting the pad to the pointing device such that the pad can be oriented at different angles to the pointing device.

In one embodiment, the pointing device is a trackball. The connector in one embodiment can be a curved slot on the bottom of the trackball or pointing device, or alternately on the pad. This matches with a protrusion extending upward from the pad, or downward from the trackball. Thus, the user can adjust the pad to accommodate the desired position for that particular user.

In addition, in a preferred embodiment, the pointing device has a ledge which extends over a portion of the pad. Thus, the design is similar to a pointing device with a palm support on the pointing device itself, except that here the palm support portion is adjustable and removable. The device can be thought of as similar to separating portions of the housing of a trackball with the palm rest portion being made adjustable with respect to the rest of the trackball.

In a preferred embodiment, the palm rest is of a soft, pliable material, as opposed to the harder plastic material of the pointing device.

For a further understanding of the nature and advantages of the invention, reference should be made to the following description taken in conjunction with the accompanying drawings.

DESCRIPTION OF THE SPECIFIC EMBODIMENTS

FIGS. 1–7 show different views of one embodiment of an apparatus according to the invention. Shown in those figures is an apparatus 10 with a trackball 12 attached to a palm pad 14. The trackball has a ledge 16 which extends over a portion of pad 14. This ledge is better visible in the view of FIG. 6.

Figure 1:
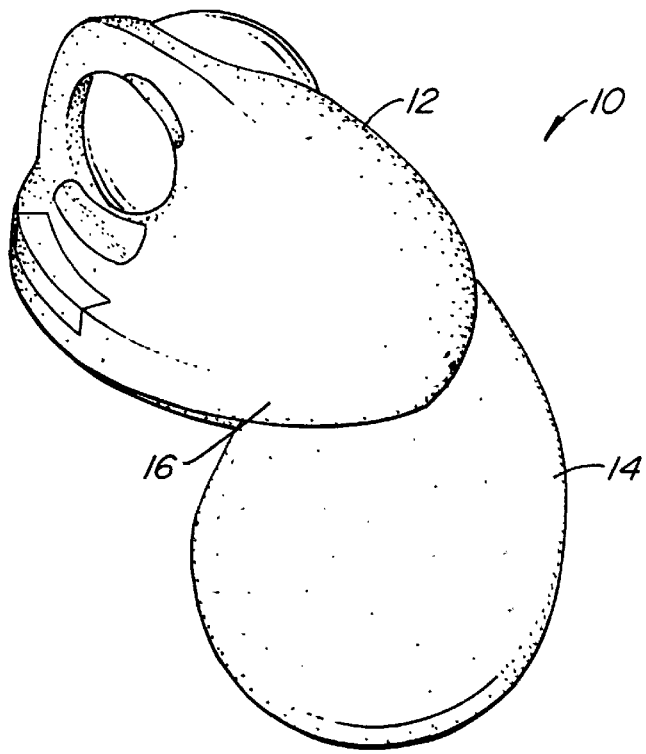
FIG. 1 is a perspective view of an embodiment of the invention with a trackball.
Figure 2:
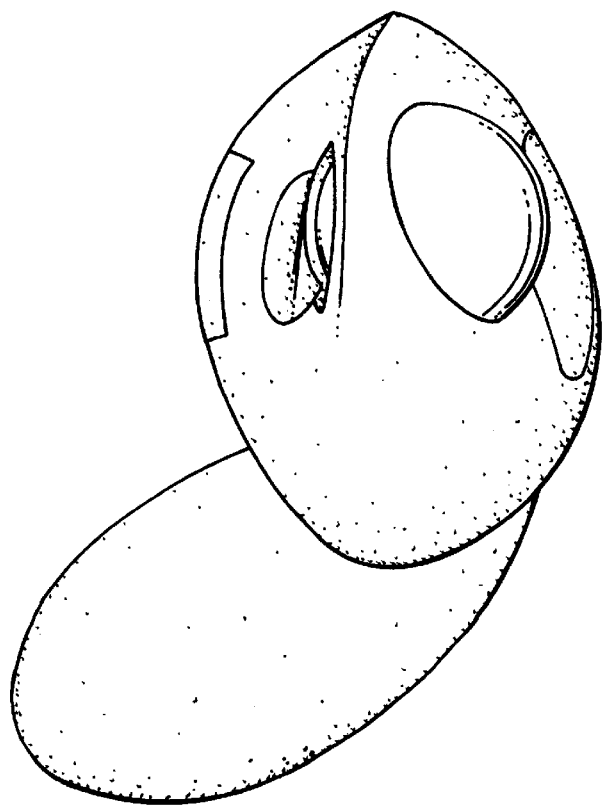
FIG. 2 is a top plan view of the embodiment of FIG. 1.
Figure 3:
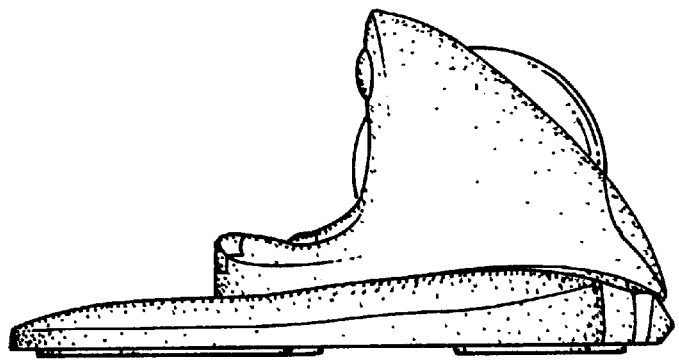
FIG. 3 is a rear plan view of the embodiment of FIG. 1.
Figure 4:
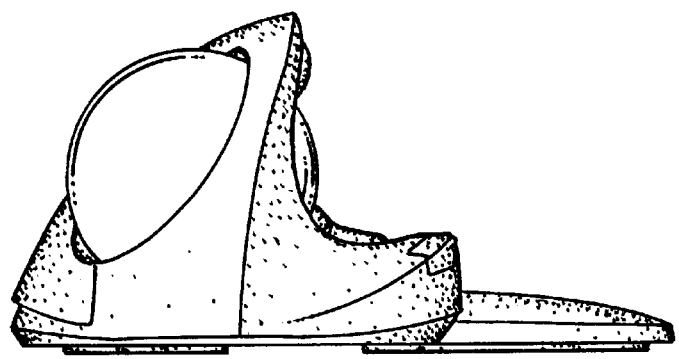
FIG. 4 is a front plan view of the embodiment of FIG. 1.
Figure 5:
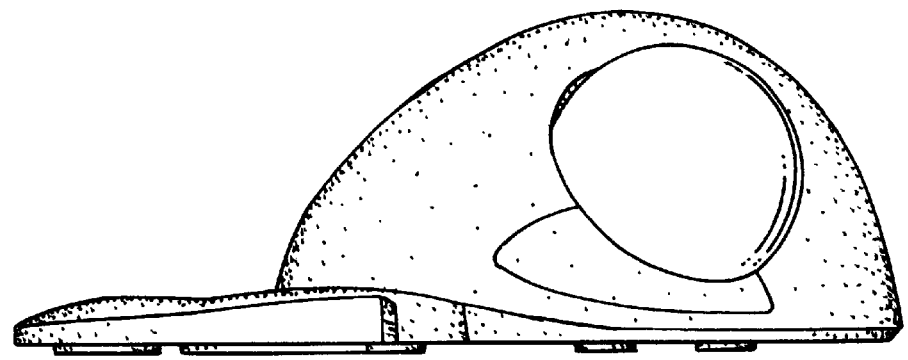
FIG. 5 is right plan view of the embodiment of FIG. 1.
Figure 6:
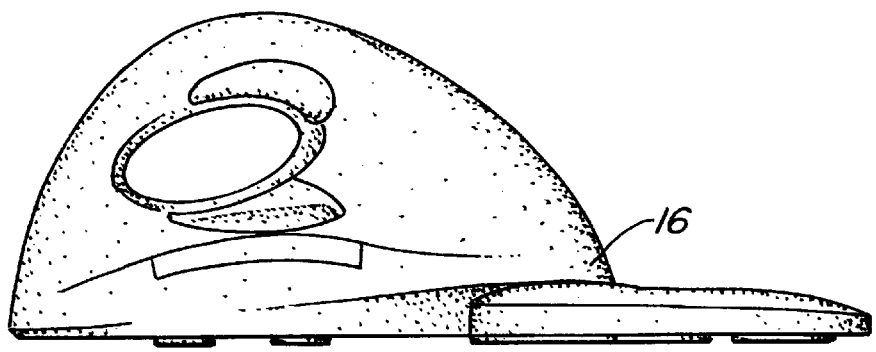
FIG. 6 is a left plan view of the embodiment of FIG. 1.
Figure 7:
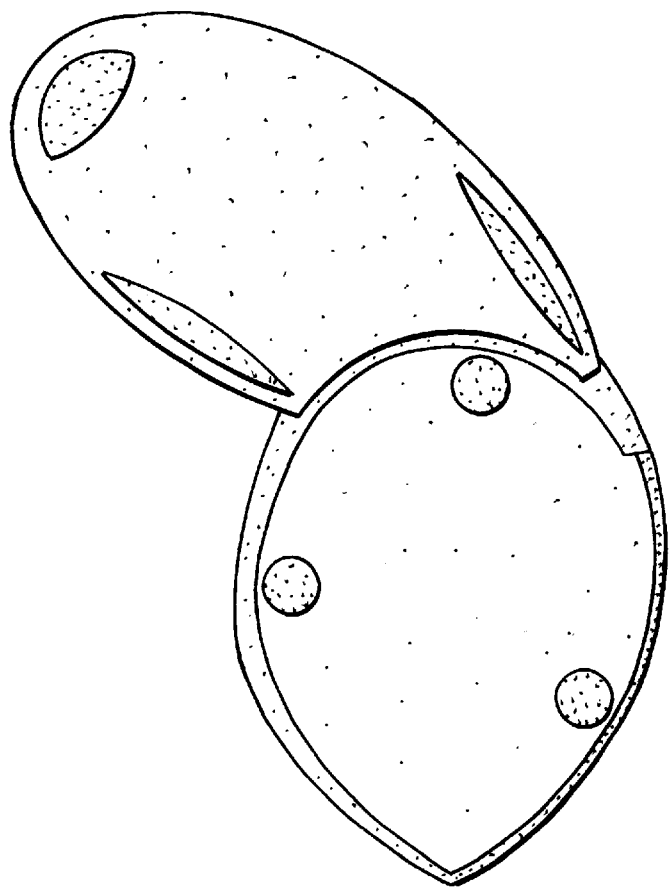
FIG. 7 is a bottom plan view of the embodiment of FIG. 1.
Figure 8:
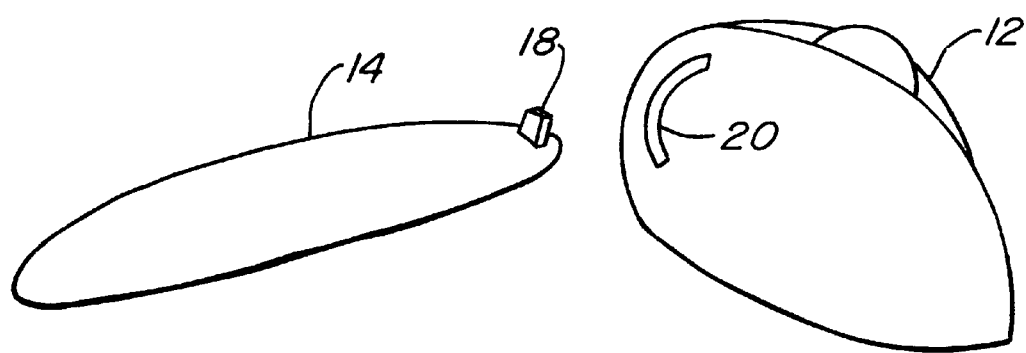
FIG. 8 is a diagram illustrating one embodiment of connector according to the invention.

Referring to FIG. 8, pad 14 includes a protrusion 18 which extends upward, and mates with a curved slot 20 in the bottom of trackball 12. As can be seen, the position can be adjusted by rotating the trackball or pad to move the protrusion within the curved slot.

Ledge 16 is shaped such that the top surface of the trackball comes down to the pad to make substantially a gapless transition. The ledge is shaped such that this gapless transition is maintained at different rotated positions of the pad.

Preferably, the pad is made of a compliant, foam rubber-type material. The protrusion can be made of the same material, or of a harder version of the material, or can be another material embedded in the pad. Alternately, a frame could extend around the pad of a harder material, including a protrusion, with the center of the pad being more compliant.

By extending under the ledge of the trackball, the pad, even though a separable piece, can provide support around a curved edge of the back of a trackball. Separate, prior art pads would butt up against the back of a trackball and not be able to provide such support around a curved edge. The adjustability allows the support to be moved to where it is needed.

As will be understood by those familiar with the art, the present invention may be embodied in other specific forms without departing from the essential characteristics thereof For example, other types of connectors could be used, such as a series of pins in corresponding holes, a Velcro™-type connection, or any other connector. Alternately, the connector could be eliminated altogether, relying instead on the friction between the support surface and the pad and the support surface and the trackball maintaining the desired alignment. Accordingly, the foregoing description is intended to be illustrative, but not limiting, of the scope of the invention which is set forth in the following claims.

What is claimed is:

1. An apparatus comprising:
    a pointing device configured to provide pointing signals to a computer;
    a pad configured to support a portion of a hand using said pointing device; and
    a connector rotatably connecting said pad to said pointing device to rotate with respect to one another, said connector being adjustable to orient said pad at different angles to said pointing device around an axis perpendicular to a surface on which the pointing device rests.

2. The apparatus of claim 1 wherein said pointing device comprises a trackball.

3. The apparatus of claim 1 wherein said connector comprises a curved slot on one of said pointing device and said pad, and a protrusion which engages said curved slot and is disposed on the other of said pointing device and said pad.

4. An apparatus comprising:

a pointing device configured to provide pointing signals to a computer;

a pad configured to support a portion of a hand using said pointing device; and a connector connecting said pad to said pointing device, said connector being adjustable to orient said pad at different angles to said pointing device, wherein said pointing device includes a ledge elevated above a support surface, and said pad extends beneath said ledge.

5. The apparatus of claim 1 wherein said pad can be oriented at different angles to support the palm of a user's hand with the wrist at different angles to the hand.

6. The apparatus of claim 1 wherein said pad is comprised of a soft, compressible material.

7. An apparatus comprising:

a trackball for providing pointing signals to a computer;

a pad for supporting a portion of a hand using said pointing device; and a connector connecting said pad to said pointing device, said connector being adjustable to orient said pad at different angles to said pointing device, wherein said connector comprises a curved slot on one of said trackball and said pad, and a protrusion for engaging said curved slot on the other of said trackball and said pad;

wherein said trackball includes a ledge elevated above a support surface, and said pad extends beneath said ledge; and wherein said pad can be oriented at different angles to support the palm of a user's hand with the wrist at different angles to the hand.

8. An apparatus comprising:

pointing device for providing pointing signals to a computer;

a pad for supporting a portion of a hand using said pointing device; and a connector connecting said pad to said pointing device, wherein said pointing device includes a ledge elevated above a support surface, and said pad extends beneath said ledge.

9. The apparatus of claim 8 wherein said connector is adjustable to orient said pad at different angles to said pointing device.

10. The apparatus of claim 8 wherein said pointing device comprises a trackball.

11. The apparatus of claim 8 wherein said connector comprises a curved slot on one of said pointing device and said pad, and a protrusion for engaging said curved slot on the other of said pointing device and said pad.

12. The apparatus of claim 8 wherein said pad can be oriented at different angles to support the palm of a user's hand with the wrist at different angles to the hand.

13. The apparatus of claim 9 wherein said pad is comprised of a soft, compressible material.

14. The apparatus of claim 8 wherein the connector rotatably connects said pad to said pointing device.

15. The apparatus of claim 8 wherein said ledge and said pad form a substantially gapless transition.

16. The apparatus of claim 7 wherein said connector comprises a curved slot on one of said ledge and a portion of said pad beneath said ledge, and a protrusion for engaging said curved slot on the other of said ledge and said portion of said pad beneath said ledge.

17. The apparatus of claim 4 wherein the connector rotatably connects said pad to said pointing device.

18. The apparatus of claim 7 wherein said ledge and said pad form a substantially gapless transition.

19. The apparatus of claim 4 wherein said connector comprises a curved slot on one of said ledge and a portion of said pad beneath said ledge, and a protrusion for engaging said curved slot on the other of said ledge and said portion of said pad beneath said ledge.

20. The apparatus of claim 4 wherein said ledge and said pad form a substantially gapless transition.

* * * * *